(12) United States Patent
Sada et al.

(10) Patent No.: US 9,887,397 B2
(45) Date of Patent: Feb. 6, 2018

(54) BATTERY CASE AND BATTERY

(71) Applicant: SANYO Electric Co., Ltd., Daito-shi, Osaka (JP)

(72) Inventors: Tomokazu Sada, Osaka (JP); Hajime Nishino, Nara (JP); Shin Haraguchi, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/118,208

(22) PCT Filed: Jan. 26, 2015

(86) PCT No.: PCT/JP2015/000316
§ 371 (c)(1),
(2) Date: Aug. 11, 2016

(87) PCT Pub. No.: WO2015/125413
PCT Pub. Date: Aug. 27, 2015

(65) Prior Publication Data
US 2017/0162837 A1  Jun. 8, 2017

(30) Foreign Application Priority Data
Feb. 20, 2014  (JP) ................ 2014-030581

(51) Int. Cl.
*H01M 2/04* (2006.01)
*H01M 2/08* (2006.01)

(52) U.S. Cl.
CPC ........... *H01M 2/0413* (2013.01); *H01M 2/08* (2013.01)

(58) Field of Classification Search
CPC .............................. H01M 2/0413; H01M 2/08
See application file for complete search history.

(56) References Cited

U.S. PATENT DOCUMENTS

| 3,294,591 A | * | 12/1966 | Jordan | ................ | H01M 2/0404 429/174 |
| 4,510,219 A | * | 4/1985 | Rowlette | ................ | H01M 4/14 429/212 |
| 2007/0154781 A1 | | 7/2007 | Choi | | |

FOREIGN PATENT DOCUMENTS

| JP | 2004-228035 A | 8/2004 |
| JP | 2007-184270 A | 7/2007 |
| JP | 2012-146766 A | 8/2012 |

OTHER PUBLICATIONS

International Search Report dated Mar. 17, 2015, issued in counterpart International Application No. PCT/JP2015/000316 (1 page).

* cited by examiner

*Primary Examiner* — Olatunji Godo
(74) *Attorney, Agent, or Firm* — Westerman, Hattori, Daniels & Adrian, LLP

(57) ABSTRACT

A battery case includes a case main body (20), a sealing body that seals an opening of the main body, and an insulating body (40) that is disposed at a part where the case body (20) and the sealing body are in contact with each other. In the battery case, an open end (22) of the case body (20) is crimped to the sealing body, and a dent (36) is formed in the sealing body by pressing the open end (22) against the sealing body.

10 Claims, 4 Drawing Sheets

BATTERY CASE AND BATTERY

TECHNICAL FIELD

The present invention relates to a battery case and a battery.

BACKGROUND ART

A battery includes, for example, an electrode assembly including a positive electrode, a negative electrode, and a separator, an electrolyte, and a battery case housing them. The battery case includes a case main body having a bottomed cylinder shape or the like and a sealing body that seals the opening of the case main body. For example, PTL 1 discloses a lithium secondary battery having a gasket that is located between a case main body and a sealing body and maintains the airtightness in the battery case.

FIG. 5 is a sectional view showing a conventional battery 50.

As shown in FIG. 5, the battery 50 includes a battery case 52 including a case main body 53 that houses an electrode assembly 51 and a sealing body 54 that seals the opening of the main body. A gasket 55 made of resin having elasticity is provided between the case main body 53 and the sealing body 54.

CITATION LIST

Patent Literature

PTL 1: Japanese Published Unexamined Patent Application No. 2007-184270

SUMMARY OF INVENTION

Technical Problem

However, in the conventional battery 50, the open end of the case main body 53 is crimped to the gasket 55, the gasket 55 is thereby compressed, and the inside of the battery case 52 is sealed. Therefore, in the conventional sealing structure, sealing performance is impaired by a decrease in compression reaction force due to deterioration of the gasket, and deterioration of the battery may be caused.

In the conventional structure in which sealing performance is secured by compressing a gasket, a gasket that is thick and has a large volume needs to be used. Therefore, the volume of a part that houses the electrode assembly decreases. Therefore, the conventional sealing structure has room for improvement from the viewpoint of improving the battery capacity.

Solution to Problem

A battery according to the present invention includes a case main body, a sealing body that seals an opening of the case main body, and an insulating body that is disposed at a part where the case main body and the sealing body are in contact with each other, and is characterized in that the open end of the case main body is crimped to the sealing body, and a dent is formed in the sealing body by pressing the open end against the sealing body.

A battery according to the present invention includes the above-described battery case, an electrode assembly housed in the battery case, and an electrolyte housed in the battery case.

Advantageous Effects of Invention

According to the present invention, a battery case that has excellent sealing performance and contributes to the improvement in battery capacity can be provided. The sealing structure of the battery case according to the present invention achieves excellent sealing performance without using a thick gasket, by crimping the open end of the case main body to the sealing body.

DESCRIPTION OF EMBODIMENTS

Figure 1:
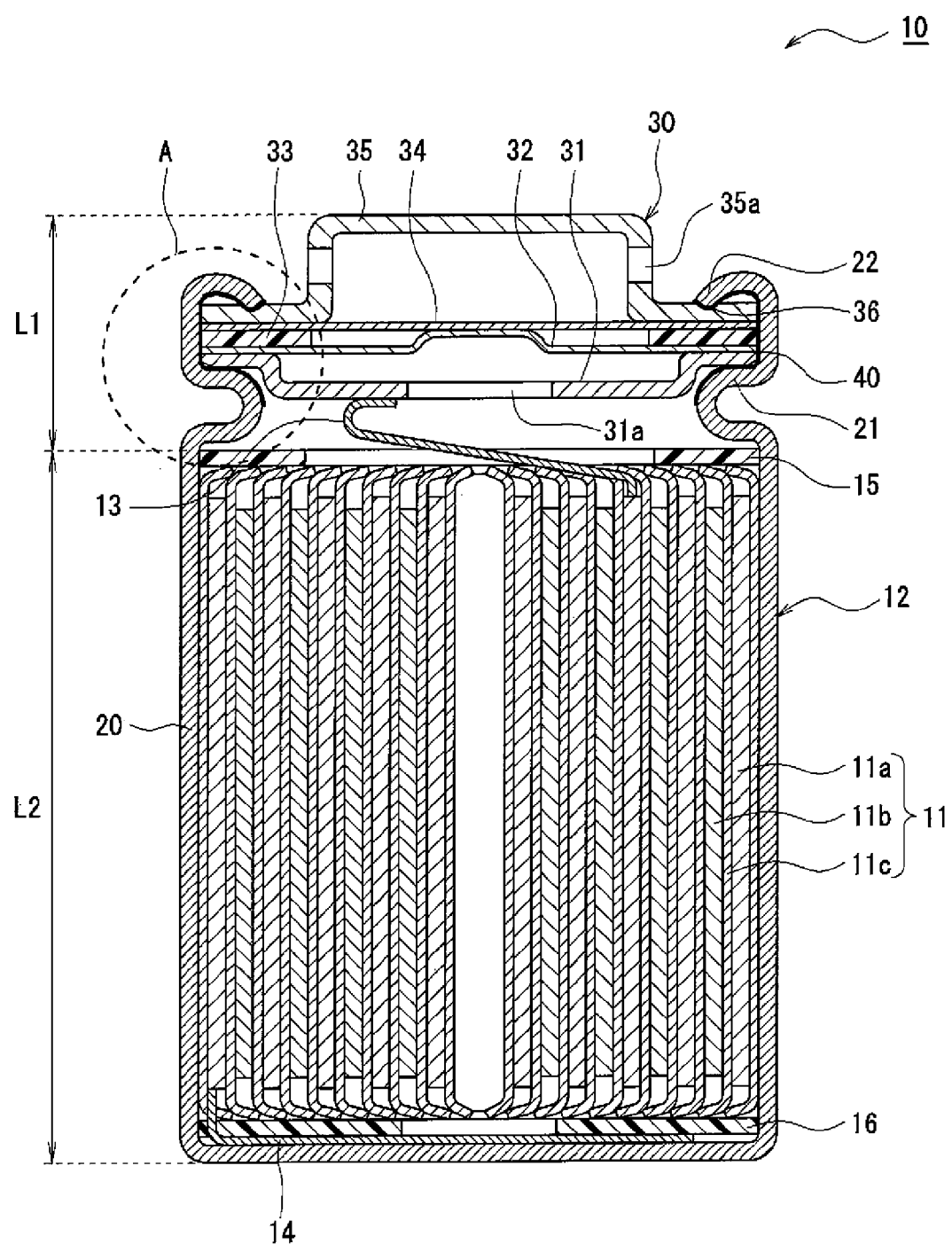
FIG. 1 is a sectional view showing a battery that is an example of an embodiment of the present invention.

An example of an embodiment of the present invention will be described in detail below with reference to the drawings.

The drawings referred to in the embodiment are schematically illustrated, and dimensional ratios and the like of components depicted in the drawings may differ from actual dimensional ratios and the like of the components. Specific dimensional ratios and the like are to be determined in consideration of the following description. For the purpose of illustration, the side of the battery and battery case on which the sealing body is located will be referred to as upper side, and the side of the battery and battery case on which the bottom of the case main body is located will be referred to as lower side.

In this embodiment, a cylindrical battery case 12 that houses a roll-type electrode assembly in which a positive electrode and a negative electrode are rolled with a separator interposed therebetween and a non-aqueous electrolyte is illustrated. However, the application of the present invention is not limited to this. For example, instead of the roll-type electrode assembly, other types of electrode assemblies, such as a laminate-type electrode assembly in which positive electrodes and negative electrodes are laminated with separators interposed therebetween, may be used. The type of the battery case may be a square type, coin type, button type, or the like.

FIG. 1 is a sectional view showing a battery 10.

As shown in FIG. 1, the battery 10 includes an electrode assembly 11, an electrolyte (not shown), and a battery case 12 housing them. The electrode assembly 11 has a roll-type structure in which a positive electrode 11a and a negative electrode 11b are rolled with a separator 11c interposed therebetween. The electrode assembly 11 has a positive electrode lead 13 attached to the positive electrode 11a and a negative electrode lead 14 attached to the negative electrode 11b. The battery case 12 includes, as described later in detail, a case main body 20, a sealing body 30 that seals the opening of the case main body 20, and an insulating body 40 that is disposed at least at a part where the case main body 20 and the sealing body 30 are in contact with each other.

The battery 10 preferably includes insulating plates 15 and 16 on the top and bottom, respectively, of the electrode assembly 11. That is, the electrode assembly 11 is sandwiched by two insulating plates from above and below. The positive electrode lead 13 extends through a through-hole of the insulating plate 15 toward the sealing body 30. The negative electrode 14 extends through a through-hole of the insulating plate 16 toward the bottom of the case main body 20.

The positive electrode 11a includes a positive electrode collector such as a metal foil, and positive electrode active material layers formed on the positive electrode collector. A foil of a metal that is stable within the potential range of the positive electrode 11a, such as aluminum, a film having a surface layer made of such a metal, or the like can be used as the positive electrode collector. The positive electrode collector has, for example, a long sheet shape, and positive electrode active material layers are formed on both sides thereof. The positive electrode active material layers preferably contain a conductive agent and a binder besides a positive electrode active material.

The positive electrode active material is, for example, a lithium-containing composite oxide. Examples of lithium-containing composite oxides include $Li_xCoO_2$, $Li_xNiO_2$, $Li_xMnO_2$, $Li_xCo_yNi_zO_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ {$0<x\le1.2$, $0<y\le0.9$, $2.0\le z\le2.3$, M is at least one of Na, Mg, Sc, Y, Mn, Fe, Co, Ni, Cu, Zn, Al, Cr, Pb, Sb, B}.

Examples of the conductive agent include carbon materials such as carbon black, acetylene black, Ketjen black, and graphite. Examples of the binder include polytetrafluoroethylene (PTFE), polyvinylidene fluoride (PVdF), and modifications thereof. The binder may be used together with a thickener such as carboxymethyl cellulose (CMC) or polyethylene oxide (PEO).

The negative electrode 11b includes a negative electrode collector such as a metal foil, and negative electrode active material layers formed on the negative electrode collector. A foil of a metal that is stable within the potential range of the negative electrode 11b, such as aluminum or copper, a film having a surface layer made of such a metal, or the like can be used as the negative electrode collector. The negative electrode collector has, for example, a long sheet shape, and negative electrode active material layers are formed on both sides thereof. The negative electrode active material layers preferably contain a binder besides a negative electrode active material. The negative electrode active material layers may contain a conductive agent if necessary.

For example, natural graphite, synthetic graphite, lithium, silicon, carbon, tin, germanium, aluminum, lead, indium, gallium, lithium alloy, carbon or silicon in which lithium is occluded in advance, or an alloy or mixture thereof can be used as the negative electrode active material. Although PTFE or the like can be used as the binder as in the case of the positive electrode, styrene-butadiene copolymer (SBR), a modification thereof, or the like is preferably used. The binder may be used together with a thickener such as CMC.

For example, a porous sheet having ion permeability and insulation property is used as the separator 11c. Specific examples of the porous film include microporous thin films, woven fabric, and nonwoven fabric. As the material of the separator 11c, cellulose, or olefin-based resin such as polyethylene or polypropylene is preferable. The separator 11c may also be a laminate having a cellulose fiber layer and a thermoplastic resin fiber layer of olefin-based resin or the like.

The electrolyte is, for example, a non-aqueous electrolyte containing a non-aqueous solvent, and an electrolyte salt such as lithium salt dissolved in the non-aqueous solvent. The non-aqueous electrolyte is not limited to liquid electrolyte, and may be solid electrolyte using gel polymer or the like. For example, esters, ethers, nitriles such as acetonitrile, amides such as dimethylformamide, a mixture solvent of two or more thereof, and the like can be used as the non-aqueous solvent. The non-aqueous solvent may contain a halogen substitute in which hydrogen of these solvents is substituted with a halogen atom such as fluorine.

The configuration of the battery case 12, especially the sealing structure of the battery case 12 will be described in detail below.

The battery case 12 is a metal container housing the electrode assembly 11 and electrolyte. The battery case 12 includes a case main body 20 having a bottomed cylinder shape, and has a structure in which the opening of the case main body 20 is sealed by a sealing body 30. In this embodiment, a negative electrode lead 14 is connected by welding or the like to the inner surface of the bottom of the case main body 20, and the case main body 20 is also used as a negative electrode external terminal. The positive electrode lead 13 is connected by welding or the like to the lower surface of a filter 31 of the sealing body 30 described later, and a cap 35 of the sealing body 30 electrically connected to the filter 31 serves as a positive electrode external terminal.

The case main body 20 preferably has a supporting portion 21 on which the sealing body 30 is mounted. As described later in detail, the sealing body 30 is held between the supporting portion 21 and an open end 22 crimped to the sealing body 30. The supporting portion 21 is formed in the upper part of the case main body 20, has a shape such that part of the inner surface of the case main body 20 protrudes inwardly, and supports the sealing body 30 with the upper surface of the protruding part. The supporting portion 21 is preferably formed annularly along the circumferential direction of the case main body 20, and is formed, for example, by pressing the side of the case main body 20 from the outside. The electrode assembly 11 and electrolyte are housed below the supporting portion 21 of the case main body 20.

The material of which the case main body 20 is formed is, for example, copper, nickel, iron, or an alloy thereof, preferably iron or iron alloy. When the case main body 20 is made of iron, the inner surface of the case main body 20 is preferably plated with nickel or the like in order to prevent the corrosion of iron.

The sealing body 30 is preferably formed by stacking a plurality of members. In this embodiment, the sealing body 30 is formed by stacking, in order from the top, a filter 31, a lower valve 32, an insulating plate 33, an upper valve 34, and a cap 35. A PTC element may be provided between the upper valve 34 and the cap 35. The respective members forming the sealing body 30 have, for example, a disk shape or a ring shape. A thin part (not shown) that breaks when the internal pressure of the battery increases is formed in each of the lower valve 32 and the upper valve 34. As described above, the filter 31 is a member to which the positive electrode lead 13 is connected, and has a through-hole 31a. The cap 35 is a member provided in the uppermost part (outermost part) of the sealing body 30, and functions as a positive electrode external terminal. A gas release hole 35a is formed in the cap 35.

The respective members forming the sealing body 30 (except the insulating plate 33) are electrically connected to each other. Specifically, the filter 31 and the lower valve 32 are joined to each other at their respective peripheries, and the upper valve 34 and the cap 35 are also joined to each other at their respective peripheries. On the other hand, the lower valve 32 and the upper valve 34 are in contact with each other at their respective central parts, and the insulating plate 33 is interposed between their respective peripheries. In the example shown in FIG. 1, the vicinity of the central part of the lower valve 32 bulges toward the upper valve 34 and is in contact with the lower surface of the upper valve 34. The contact parts of the respective valves are preferably joined by welding or the like.

In this embodiment, when the internal pressure of the battery 10 increases, first, the lower valve 32 breaks at the thin part. Thereby, the upper valve 34 bulges toward the cap 35 and comes out of contact with the lower valve 32, and the electrical connection therebetween is broken. When the internal pressure increases further, the upper valve 34 breaks at the thin part, and gas generated in the battery is discharged through the gas release hole 35a of the cap 35 to the outside.

The material of which the sealing body 30 is formed (except the insulating plate 33) is preferably aluminum or aluminum alloy. The cap 35 may be made of iron or iron alloy. The insulating plate 33 (the same goes for the insulating plates 15, 16) is formed of resin having excellent insulation property and chemical resistance (electrolyte resistance), and may contain reinforcement material such as glass fiber.

An insulating body 40 is provided between the inner surface of the case main body 20 and the outer peripheral surface and upper and lower surfaces of the sealing body 30. The insulating body 40 plays a role in particularly preventing the electrical contact between the case main body 20 and the sealing body 30. Specifically, insulation is preferably secured at a battery voltage of at least about 4 V. In this embodiment, the insulating body 40 is provided from the open end 22, which is the upper end of the case main body 20, to the supporting portion 21. The insulating body 40 may be provided, for example, on the sealing body 30 side, but is preferably formed as a thin film layer (insulating film) on the inner surface of the case main body 20. The thickness of the insulating body 40 is preferably small as long as the insulating function is not impaired, for example, 10 μm to 1000 μm.

The insulating body 40 is preferably formed of resin 41 (see FIG. 3 described later) having excellent insulation property, chemical resistance (electrolyte resistance), adhesion to the case main body 20, and the like. Specific examples include polyolefin-based resins such as polyethylene and polypropylene, polyester-based resins such as polyethylene terephthalate, polyamide-based resins, fluorine-based resins, and elastomers thereof. Alternatively, a resin that has a high crosslinking density and is hard (for example, epoxy resin) may be used. The same resin as that used as an electrode binder, for example, PTFE, PVdF, or SBR may also be used.

The insulating body 40 may be provided, for example, by attaching a resin sheet to the inner surface of the case main body 20 with an adhesive or the like, but is preferably a resin coating film (resin layer) applied to the inner surface of the case main body 20 from the viewpoint of adhesion to the case main body 20, productivity, and the like. The resin coating film can be formed, for example, by applying a solution in which the resin 41 is dissolved to the inner surface of the case main body 20 and volatilizing away (drying) a solvent such as an organic solvent.

Figure 2:
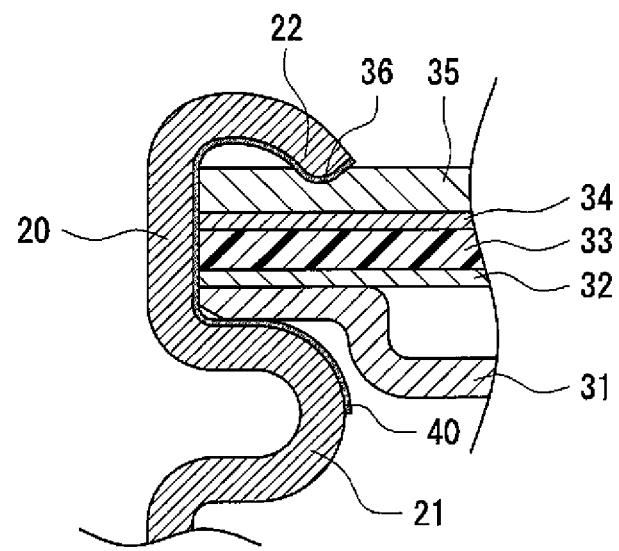
FIG. 2 is an enlarged view of part A.

FIG. 2 is an enlarged view of part A and shows the sealing structure of the battery case 12.

As shown in FIG. 2, the open end 22, which is the upper end of the case main body 20, is crimped to the sealing body 30. The open end 22 is pressed against the sealing body 30, and a dent 36 is thereby formed in the sealing body 30. That is, the open end 22 is in contact with the sealing body 30 so hard that the dent 36 is formed. In the battery case 12, by crimping the open end 22 to the sealing body 30, the airtightness in the battery case 12 can be secured. The open end 22 is crimped throughout the length of the case main body 20 in the circumferential direction, and an annular dent 36 is formed in the upper surface of the sealing body 30. The sealing body 30 is held by and between the supporting portion 21 and the open end 22 from above and below.

In the sealing structure of the battery case 12, in order to achieve excellent sealing performance, the open end 22 needs to be pressed hard against the sealing body 30 and to dig into the sealing body 30. Therefore, the degree of hardness (hardness) of the sealing body 30 is less than or equal to the degree of hardness of the case main body 20, and is preferably set lower than the degree of hardness of the case main body 20. That is, the sealing body 30 is preferably softer and more deformable than the case main body 20. The degree of hardness of the case main body 20, sealing body 30, and filler 42 described later can be measured with an measuring apparatus such as Shimadzu Corporation DUH-W201.

In this embodiment, the open end 22 is pressed against the cap 35 of the sealing body 30. That is, the degree of hardness of the cap 35 is preferably less than or equal to the degree of hardness of the case main body 20. As described above, the material of which the case main body 20 is formed is, for example, iron or iron alloy, and the material of which the cap 35 is formed is, for example, iron, aluminum, or an alloy thereof. A cap 35 made of aluminum is preferably used from the viewpoint of improving sealing performance.

A corner of the open end 22 that is pressed against the sealing body 30 is preferably chamfered. That is, the corner of the open end 22 is preferably rounded. In this case, a dent 36 having a substantially semicircular cross-sectional shape is formed in the sealing body 30. Thereby, the contact area between the open end 22 and the sealing body 30 is increased, and sealing performance is improved. For example, the pressure applied to the insulating body 40 is reduced, the damage to the insulating body 40 can be prevented, and insulating performance is also improved.

In the sealing structure of the battery case 12, the insulating body 40 is interposed between the open end 22 and the dent 36, and secures the insulation between the case main body 20 and the sealing body 30. The insulating body 40 only have to have the insulating function, and need not be compression-deformed like the conventional gasket 55 (see FIG. 5). That is, in the sealing structure of the battery case 12, sealing performance is secured by crimping the open end 22 to the sealing body 30, and the insulating body 40 is not necessary considering only sealing performance. Therefore, the sealing structure of the battery case 12 can be said to be a structure such that the sealing function and insulating function, which have been borne by a gasket, are shared by the above crimping structure and insulating body 40.

Figure 3:
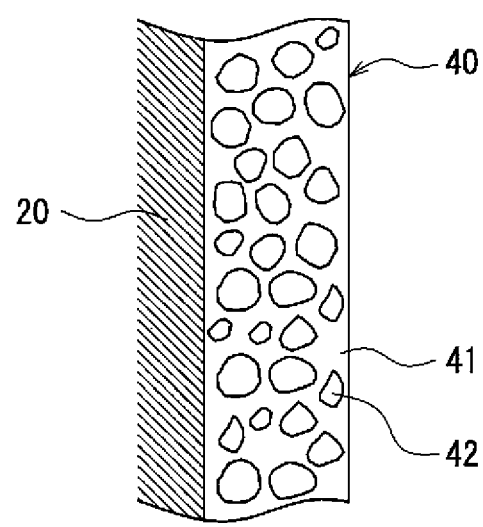
FIG. 3 is a sectional view showing an insulating body that is an example of an embodiment of the present invention.

FIG. 3 is a sectional view of the insulating body 40.

As shown in FIG. 3, the insulating body 40 preferably contain insulating filler 42. That is, the insulating body 40 preferably has a structure such that filler 42 is dispersed in a thin film layer formed of resin 41. The filler 42 plays the role of reinforcing the insulating body 40, and prevents the insulating body 40 from being crushed by the above crimping and thereby deteriorating in insulation property. Therefore, the degree of hardness of the filler 42 is preferably higher than at least the degree of hardness of the sealing body 30, and may be higher than the degree of hardness of the case main body 20. From the viewpoint of improving the sealing property and insulating property, the degrees of hardness of the respective members relating to the sealing structure are preferably such that filler 42 (insulating body 40)≥case main body 20>sealing body 30 (cap 35).

The desirable filler 42 is one that disperses well in resin 41 and is hard. Specific examples include metal oxide particles, for example, alumina, silica, and titanium oxide. The particle diameter (volume average particle diameter) of the filler 42 is preferably 0.1 μm to 10 μm, although it varies depending on the thickness of the insulating body 40. The contained amount of the filler 42 is determined from the viewpoint of the reinforcing property of the insulating body 40, the adhesion between the insulating body 40 and the case main body 20, and the like, and is, for example, 5 vol % to 70 vol %, preferably 10 vol % to 50 vol % of the total volume of the insulating body 40.

By using a battery case 12 having the above configuration, a battery 10 having excellent sealing performance and a large capacity can be provided. According to the battery case 12, the airtightness of the inside can be maintained over a long period of time, and, for example, the life span of the battery 10 can be lengthened.

In the sealing structure of the battery case 12, unlike the conventional structure in which the airtightness is secured by compressing a gasket, the airtightness is secured by crimping the case main body 20 to the sealing body 30 and bringing both into very close contact with each other. Because the stress due to the crimping is maintained over a long period of time, unlike the conventional structure, sealing performance is not impaired by a decrease in compression reaction force of the gasket or the like, and excellent sealing performance can be maintained over a long period of time.

In the conventional sealing structure, a thick gasket needs to be used. However, in the case of the battery case 12, the resin layer provided between the case main body 20 and the sealing body 30 only have to have the insulating function, and the thickness thereof can be considerably reduced compared to the conventional gasket. That is, in the sealing structure of the battery case 12, a thick gasket need not be used. Thereby, the volume of a part of the battery case 12 that houses the electrode assembly 11 (below the supporting portion 21) can be increased. Therefore, according to the sealing structure of the battery case 12, an electrode assembly 11 having a large electrode area can be used, and the battery capacity can be improved.

Figure 5:
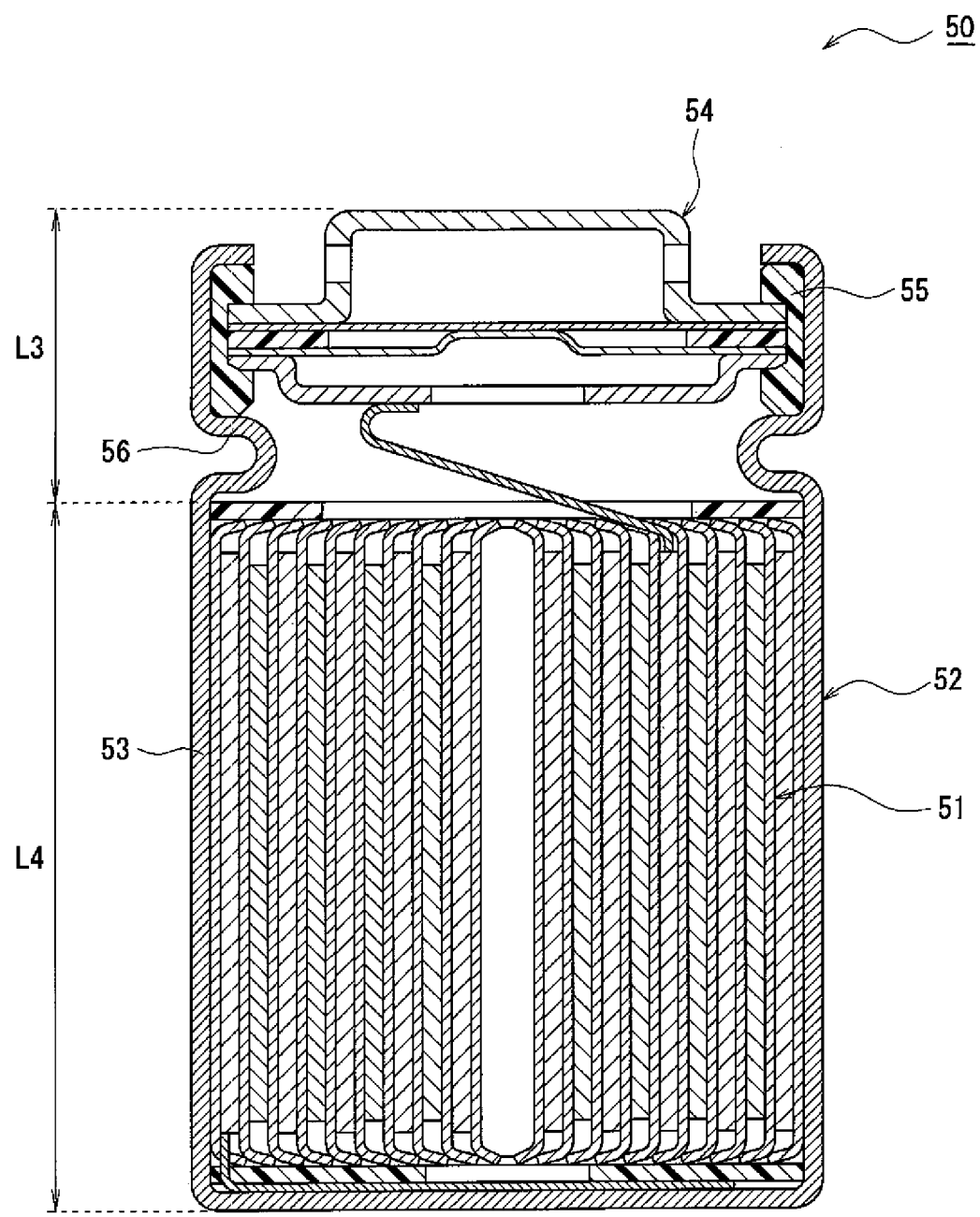
FIG. 5 is a sectional view showing a conventional battery.

For example, when the vertical length from the upper end of the conventional battery case 52 to the lower end of the supporting portion 56 is L3, the vertical length of the corresponding part of the battery case 12 can be L1 shorter than L3 (see FIGS. 1 and 5). Therefore, according to the battery case 12, the vertical length of a part that houses the electrode assembly 11 (below the supporting portion 21) can be increased (L2>L4), and an electrode assembly 11 larger than conventional ones can be housed (the total lengths of the respective cases are the same).

The above embodiment can be design-changed without impairing the object of the present invention.

Figure 4:
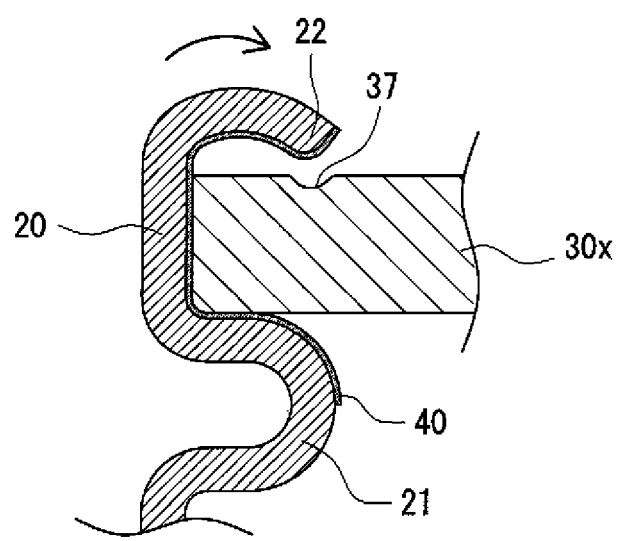
FIG. 4 shows a modification of a sealing structure that is an example of an embodiment of the present invention.

For example, as shown in FIG. 4, a recess 37 into which the open end 22 is fitted may be formed in advance in a part of the sealing body 30*x* against which the open end 22 is pressed. The recess 37 is preferably formed annularly in the upper surface of the sealing body 30*x*. Also in this case, the open end 22 is crimped and pressed against the recess 37, and the recess 37 is thereby depressed further. That is, a dent 36 is formed in the recess 37. By forming the recess 37 in advance, for example, the damage to the insulating body 40 can be prevented, and the sealing distance can be gained.

Although, in the above embodiment, a gas discharge unit for internal pressure rise is provided in the sealing body 30, the gas discharge unit may be provided in the case main body 20.

INDUSTRIAL APPLICABILITY

The present invention is applicable to a battery case and a battery.

REFERENCE SIGNS LIST 10, 50 battery
11, 51 electrode assembly
11*a* positive electrode
11*b* negative electrode
11*c* separator
12, 52 battery case
13 positive electrode lead
14 negative electrode lead
15, 16, 33 insulating plate
20, 53 case main body
21, 56 supporting portion
22 open end
30, 30*x*, 54 sealing body
31 filter
31*a* through-hole
32 lower valve
34 upper valve
35 cap
35*a* gas release hole
36 dent
37 recess
40 insulating body
41 resin
42 filler
55 gasket

The invention claimed is:
1. A battery case comprising:
a case main body;
a sealing body that seals an opening of the case main body; and
an insulating body that is disposed at a part where the case main body and the sealing body are in contact with each other,
wherein an open end of the case main body is crimped into a dent in the sealing body.
2. The battery case according to claim 1, wherein the insulating body contains filler harder than the sealing body.
3. The battery case according to claim 1, wherein the insulating body is a resin coating film applied to the inner surface of the case main body.
4. The battery case according to claim 1, wherein a recess into which the open end is fitted is formed in advance in a part of the sealing body against which the open end is pressed.
5. The battery case according to claim 1, wherein a corner of the open end that is pressed against the sealing body is chamfered.
6. A battery comprising:
a battery case according to claim 1;
an electrode assembly housed in the battery case; and
an electrolyte housed in the battery case.

7. The battery case according to claim 1, wherein the sealing body has an upper surface and an annular dent is formed in said upper surface.

8. The battery case according to claim 1, wherein the case main body has a degree of hardness and wherein the sealing body has a degree of hardness that is less than or equal to the degree of hardness of the case main body.

9. The battery case according to claim 1, wherein the case main body has a degree of hardness and wherein the filler has a degree of hardness that is higher than the degree of hardness of the case main body.

10. The battery case according to claim 1, wherein the insulating body has a total volume and wherein the filler has a contained amount of 5 vol % to 70 vol % of the total volume of the insulating body.

* * * * *